US011726693B2

(12) United States Patent
Ng et al.

(10) Patent No.: US 11,726,693 B2
(45) Date of Patent: Aug. 15, 2023

(54) MIGRATING PAGES OF MEMORY ACCESSIBLE BY INPUT-OUTPUT DEVICES

(71) Applicant: ATI Technologies ULC, Markham (CA)

(72) Inventors: Philip Ng, Toronto (CA); Nippon Raval, Mississauga (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/136,989

(22) Filed: Dec. 29, 2020

(65) Prior Publication Data

US 2022/0206700 A1 Jun. 30, 2022

(51) Int. Cl.
*G06F 3/06* (2006.01)
*G06F 12/1009* (2016.01)

(52) U.S. Cl.
CPC ............ *G06F 3/0647* (2013.01); *G06F 3/061* (2013.01); *G06F 3/0604* (2013.01); *G06F 3/0673* (2013.01); *G06F 12/1009* (2013.01)

(58) Field of Classification Search
CPC combination set(s) only.
See application file for complete search history.

(56) References Cited

U.S. PATENT DOCUMENTS

2019/0361728 A1* 11/2019 Kumar .................... H04L 67/34

* cited by examiner

*Primary Examiner* — Yong J Choe
(74) *Attorney, Agent, or Firm* — Park, Vaughan, Fleming & Dowler LLP

(57) ABSTRACT

An electronic device includes a memory, an input-output memory management unit (IOMMU), a processor that executes a software entity, and a page migration engine. The software entity and the page migration engine perform operations for preparing to migrate a page of memory that is accessible by the at least one IO device in the memory, the software entity and the page migration engine set migration state information in a page table entry for the page of memory based on the operations being performed. When the operations for preparing to migrate the page of memory are completed, the page migration engine migrates the page of memory in the memory. The IOMMU uses the migration state information in the page table entry to control one or more operations of the IOMMU.

24 Claims, 5 Drawing Sheets

MIGRATING PAGES OF MEMORY ACCESSIBLE BY INPUT-OUTPUT DEVICES

BACKGROUND

Related Art

Some electronic devices include a processor (e.g., a central processing unit, etc.) that performs computational, control, memory access, and other operations, along with a memory in which data is stored (where "data" is used as a generic term for information such as program code instructions, input or result data for and from computational operations, constant values, etc.). Many of such electronic devices also include input-output (IO) devices such as network interface devices, disk controllers, etc. The IO devices can interact with the processor and memory for performing various operations. For example, a network interface device may store data received via a network in the memory and then signal the processor that the data stored in the memory is awaiting processing.

In some cases, data stored in the memory in an electronic device can be stored in the memory in such a way that accessing the data is inefficient. For example, the memory may be implemented using a combination of two different types of memory, one of the types of memory being a faster access but more costly type of memory and the other being a slower access but less costly type of memory. An inefficiency can arise in such a memory when often accessed, high priority, and/or time-critical data is stored in the slower type of memory or vice versa. As another example, an inefficiency can arise when data is stored in a remote part of the memory such as a portion of the memory in a remote socket of a non-uniform memory access (NUMA) electronic device.

Because inefficiencies in accessing data in memory can impact the overall performance of an electronic device, some electronic devices include a migration mechanism for dynamically relocating, or "migrating," data in memory so that data is stored in more appropriate locations in memory. For example, data in memory may be organized into contiguous blocks of data, or "pages of memory," of specified sizes (e.g., 4 KiB, 2 MiB, etc.) for the purposes of memory management and migration. A migration mechanism can monitor the accesses of the pages of memory and selectively migrate the pages of memory based on specified patterns or characteristics of the accesses of the pages of memory. For example, in an electronic device with the above-described two different types of memory, when a page of memory that is stored in a lower speed type of memory is being accessed sufficiently often, the migration mechanism can migrate the page of memory from the lower speed type of memory to a higher speed type of memory. In some electronic devices, the migration mechanisms migrate pages of memory automatically and of their own accord—and thus pages of memory can be migrated without communicating information about the migration to each of the accessing entities with access to the pages of memory (e.g., processors, IO devices, etc.). In other words, the migration mechanisms migrate pages of memory "behind the scenes," without each of the accessing entities necessarily having direct knowledge of, granting approval for, and/or being party to the migration.

In some electronic devices, some or all IO devices do not provide support for migrating pages of memory. For example, the IO devices may be older or simpler IO devices that do not include software and/or hardware support for handling faults (e.g., page faults, etc.) that can occur when pages of memory are found to be temporarily unavailable as the pages of memory are migrated. If a page of memory accessible to such an IO device was to be migrated and the IO device attempted to access the page of memory or information associated with the page of memory (e.g., address translation information, etc.) during migration, the IO device and/or other functional blocks and devices in the electronic device (e.g., the processor, etc.) may crash, experience errors, or operate in an unexpected or undesirable way.

BRIEF DESCRIPTION OF THE FIGURES

Throughout the figures and the description, like reference numerals refer to the same figure elements.

DETAILED DESCRIPTION

Figure 1:
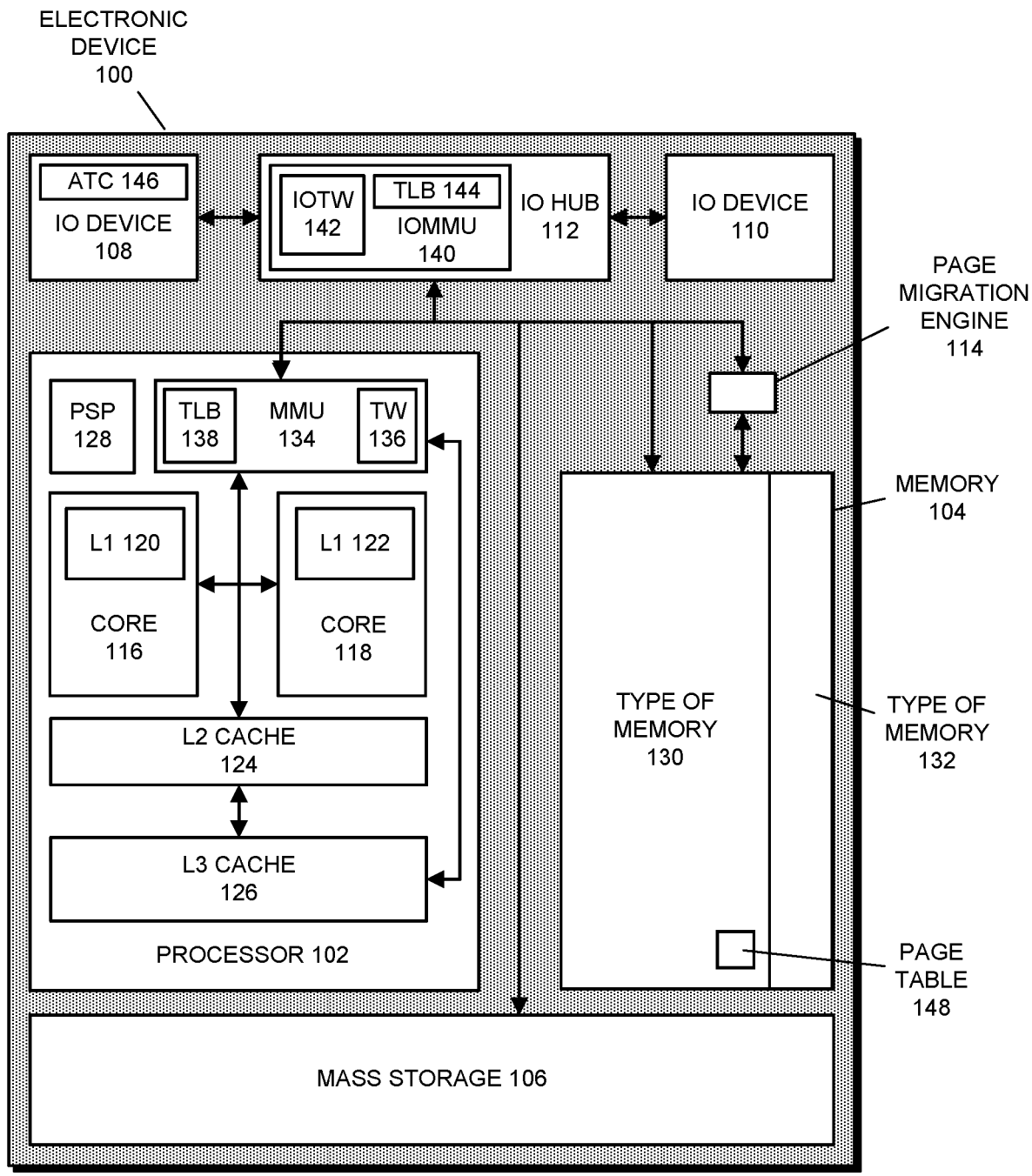
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, and/or other information Data can be organized into logical blocks (e.g., a 4 KiB or 2 MiB page of memory, etc.) that include one or more of the above-described types of information for operations such as loading the data into a memory, migration, etc.

Accesses: accesses, as applied to interactions with data stored in memories (e.g., main memories, cache memories, etc.), or "memory accesses," indicates all forms of interactions that can be performed for, on, using, and/or with data and corresponding metadata and/or control values. For example, accesses can include reads or loads of data from memories, writes or stores of data to memories, invalidations or deletions of data in memories, reads or writes of metadata for data in memories, changes of status, coherency state, or permissions for data in memories, etc. When a particular type of memory access is allowed/permitted for a given functional block or device, the data is "accessible" to the given functional block or device.

Virtual Memory

In the described embodiments, an electronic device uses a virtual memory technique for handling data accesses by software entities being executed in the electronic device (e.g., application programs, operating systems, device drivers, virtual machines, etc.) or by input-output (IO) devices (e.g., network interface devices, Peripheral Component Interface Express (PCIe) bus devices, disk controllers, etc.). Generally, when data is initially accessed by a software entity or an IO device, a block or page of memory of a given size (e.g., 4 KiB, 2 MiB, etc.) that includes the data is copied from mass storage (e.g., a disk drive or a non-volatile semiconductor memory) to an available physical location in a memory (e.g., a main memory) in the electronic device or a page of memory is newly created in the memory (e.g., for storing the results of computational or other operations, etc.). In order to avoid software entities and IO devices being required to keep track of the physical locations of pages in memory, the electronic device keeps track of the physical locations of the pages for the software entities or IO devices. The software entities and IO devices access memory using "virtual" addresses in virtual address spaces, which are local address spaces that are specific to corresponding software entities or IO devices, instead of accessing memory using addresses based on the physical locations (or physical addresses) of data in the memory. From a software entity's or an IO device's perspective, virtual addresses indicate the actual physical locations where data is stored in memory, and memory accesses are made by software entities and IO devices using the virtual addresses accordingly. The virtual addresses, however, may not map directly to the physical addresses of the physical locations where data is stored in pages in the memory. As part of keeping track of the physical locations of pages, the electronic device translates the virtual addresses used by the software entities and IO devices in memory access requests into the physical addresses where the data is actually located. The electronic device then uses the physical addresses to perform the memory accesses for the software entities and IO devices.

In order to enable the above-described virtual address to physical address translations, the electronic device includes a page table. The page table is a record stored in a memory of the electronic device that includes an entry, or a "page table entry," with virtual address to physical address translation information and other information for pages of data that are stored in the memory. In other words, the page table includes mappings of virtual addresses to corresponding physical addresses for each page of data that is present in the memory. Upon receiving a request from a software entity or an IO device to access memory at a given virtual address, the electronic device acquires corresponding physical address information from the page table by performing a page table walk, during which the page table is searched for a page table entry that provides the physical address associated with the virtual address. For example, upon receiving a request from an operating system to access memory at a given virtual address, a memory management unit (MMU) in a central processing unit (CPU) core in the electronic device can perform a page table walk to acquire corresponding physical address information from the page table and can process the memory access using the physical address information. As another example, upon receiving a request from an IO device to access memory at a given virtual address, an input-output memory management unit (IOMMU) in the electronic device can perform a page table walk to acquire corresponding physical address information from the page table and can process the memory access using the physical address information.

Because the above-described page table walks are relatively slow, it is desirable to avoid performing page table walks. The electronic device therefore includes translation lookaside buffers (TLBs), which are local caches that are used for storing a limited number of copies of address translation information acquired during page table walks (i.e., information based on page table entries). For example, a CPU can include a TLB that is used for locally storing copies of information based on page table entries (or copies of the page table entries themselves) that is used for memory accesses for software entities. As another example, an IOMMU can include a TLB that is used for locally storing copies of information based on page table entries (or copies of the page table entries themselves) that is used for memory accesses for IO devices. During operation, the CPU core or IOMMU first attempts to acquire cached page table entries from the corresponding TLB for performing virtual address to physical address translations. When the copy of the corresponding page table entry is not present in the TLB (i.e., when a "miss" occurs), the CPU core or IOMMU performs a page table walk to acquire the desired page table entry. The CPU core or IOMMU can then cache a copy of the acquired page table entry in the respective TLB for subsequent use.

In some embodiments, the IOMMU and the IO device support communication protocols for address translation such as PCI Express (PCIe) Address Translation Services (ATS). For ATS, input-output (IO) devices can include respective local caches, or "address translation caches" (ATCs), that each IO device uses for storing copies information based on page table entries (or the page table entries themselves). Generally, when an IO device desires a local copy of information based on a page table entry (or, more simply, a copy of the entire page table entry), the IO device requests the information based on the page table entry from the IOMMU. The IOMMU checks to ensure that the IO device is permitted to have the information and then provides the information based on the page table entry to the IO device. The IO device next stores the information based on the page table entry in the ATC for subsequent use. Using the ATC, therefore, IO devices can avoid the need for repeatedly requesting information based on page table entries from the IOMMU.

Migrating Pages of Memory

In the described embodiments, pages of memory can be migrated within a memory. For migration, a page of memory is physically moved within the memory so that the page is relocated from a first location in memory to a second location in the memory. For example, if the page of memory is an 8 KiB page of memory and is initially located at addresses A through A+8 KiB−1, the page can be migrated to addresses B though B+8 KiB−1. In some embodiments, pages of memory are migrated in order to relocate pages of memory to locations in memory that are better suited for the pages of memory and/or the memory itself. For example, often-accessed or higher priority pages of memory may be migrated from a first type of memory with slower access speed to a second type of memory with faster access speed or vice versa. As another example, a page of memory may be migrated within the memory to avoid wear on memory circuitry in the memory. As yet another example, a page of memory may be migrated in the memory to locate the page of memory closer to other pages of memory that are being accessed. As yet another example, in some embodiments, the memory is configured for non-uniform memory access (NUMA), with each of a number of portions of the memory being located closely to respective processing nodes, and a page of memory can be migrated between the portions of the memory in the nodes.

In some embodiments, the decision to migrate a page of memory is made by a software entity and/or a functional block or device in an electronic device based on one or more migration rules (i.e., guidelines, standards, thresholds, etc.) that identify conditions under which pages of memory are to be migrated. For example, an operating system or hypervisor executed by a processor in the electronic device can determine that a page of memory is to be migrated based on the frequency or type of accesses being made of the page of memory. As another example, a memory management unit functional block in a processor can determine that a page of memory is to be migrated from a slower access memory to a faster access memory based on a priority identified in memory access requests for the page of memory.

Although a processor is capable of migrating pages of memory in the memory, i.e., of physically moving the individual bytes of the page of memory in the memory, using the processor to perform migrations can consume processor resources that are better used for other operations (e.g., computational operations, other types of memory accesses, etc.). In some embodiments, therefore, the migration of pages of memory is offloaded from the processor to a page migration engine functional block or device (which can include a direct memory access (DMA) functional block that performs operations for physically moving pages of memory within the memory). The page migration engine, given an identification of a page of memory and a destination location in memory, can perform—and may be optimized to perform—the migration of the page of memory.

Overview

In the described embodiments, an electronic device includes a processor and one or more input-output (IO) devices (where IO devices can include functional blocks or actual devices such as network interfaces, disk controllers, graphics processing units, etc.). The electronic device also includes a memory that is used for storing data for use by the processor and/or the IO devices. The electronic device further includes at least one page migration engine functional block that performs operations for copying, moving, and otherwise handling data stored in the memory. As part of these operations, the page migration engine performs operations associated with migrating pages of memory (e.g., 4 KiB pages of memory), which involves relocating the pages of memory within the memory in accordance with migration rules. The electronic device also includes an input-output memory management unit (IOMMU) that manages memory accesses by the IO devices. In the described embodiments, the IOMMU performs operations for controlling IO device accesses of pages of memory that are accessible to IO devices and that are to be or are being migrated, as well as controlling the use of information from page table entries for such pages of memory. The operations performed by the IOMMU are directed at ensuring that IO devices— and, more generally, the electronic device—do not experience errors or failures that might occur if the IO devices accessed a page of memory that was being migrated (or encountered a missing page of memory) and/or used incorrect information from a page table entry for such a page of memory.

In the described embodiments, a page table includes migration information in page table entries that is used to assist with controlling accesses of pages of memory that are being migrated and the respective page table entries. The page table entries include, along with the above-described translation information and metadata, migration state information. The migration state information includes an indication of whether preparations are being made for migrating the page of memory associated with the page table entry or the page of memory is being migrated (or not). For example, in some embodiments, the migration state information includes two bits, with each possible combination of the two bits identifying a corresponding migration state from among a set of migration states. In the first, or "non-migration," migration state, identified by 00, the page of memory is not being migrated. In the second and third migration states, identified by 01 and 10, respectively, corresponding preparations are being made for migrating the page of memory. In the fourth migration state, identified by 11, final preparations are being made for migrating the page of memory or the page of memory is in the process of being migrated (i.e., is actually being relocated in the memory).

In some embodiments, the processor executes a software entity that, in combination with the page migration engine, performs at least some of the operations for preparing pages of memory for migration and handling the migration of the pages of memory. For example, the software entity can be or include a hypervisor, an operating system, an application program, etc. Among the operations performed by the software entity and/or the page migration engine for preparing for migrating pages of memory is setting the migration state information for the pages of memory. For example, as functional blocks and devices in the electronic device proceed through each of the above-described migration states, the software entity or the page migration engine can set the migration state information accordingly. Another operation performed by the software entity and/or the page migration engine is invalidating existing copies of information from page table entries for migrating pages stored in caches in the IOMMU or the IO devices. A further operation performed by the page migration engine is, after migrating pages of memory, updating page table entries for the pages of memory to identify the new locations in the memory for the pages of memory and setting the migration state information in the page table entries to indicate the non-migration migration state.

In some embodiments, the IOMMU enforces access restrictions for the page of memory and the page table entry based on the migration state information in the page table entry. For example, when the migration state information indicates that preparations are being made for migrating the page of memory or the page of memory is being migrated, the IOMMU can prevent the IOMMU itself and the IO devices from storing or using copies of information from the page table entry in local caches. As another example, when the migration information in the page table entry indicates that the page of memory is being prepared for migration or is being migrated, the IOMMU can ensure that accesses of the page of memory are handled accordingly. That is, the IOMMU can ensure that existing memory accesses of the page of memory are completed before the page of memory is migrated and newly encountered memory accesses of the page of memory are stalled (i.e., held, buffered, etc.) until after the page of memory is migrated. In contrast, when the migration information in the page table entry indicates that the page of memory is in the non-migration migration state (and thus is not being migrated), the IOMMU can allow normal accesses of the page of memory and the page table entry.

In some embodiments, some or all of the IO devices support an address translation service (ATS) such as the PCI Express (PCIe) Address Translation Service, which is a standard under which IO devices can request, from the IOMMU, information from page table entries to be locally cached in entries in local caches, or "address translation caches (ATCs)," in the IO devices. As part of the above-described operations for preventing the storage of copies of information from a page table entry in caches in the IO devices, the IOMMU can reject/deny ATS requests for information from page table entries associated with pages of memory that are to be or are being migrated. For example, in some embodiments, the IOMMU can respond to ATS requests by informing the requesting IO device that the page of memory is not present, which causes the IO device to proceed with operations for making the page of memory present in the IO page table. As another example, the IOMMU can inform requesting IO devices that untranslated addresses should be used for accessing the page of memory—and thus that the IO devices will not be provided with information from the IO page table entry.

Although the above-described operations are performed for pages of memory that are accessible to IO devices and that are being prepared for migration or are being migrated, other types of pages of memory can be handled differently during migration. For example, in some embodiments, pages of memory that are not accessible to IO devices, but instead are accessible only to processors, may be migrated by marking the page as "not present" in respective page table entries and invalidating any copies of page table information for such pages of memory in caches (i.e., translation lookaside buffers) in the processors. In this case, the processors include mechanisms for handling missing pages (e.g., via page faults, etc.). In addition, pages of memory that are not being prepared for migration or being migrated and their respective page table entries, even when accessible to IO devices, can be accessed normally—although in consideration of memory access ordering rules, etc.

By handling the migration of pages of memory that are accessible to IO devices, the described embodiments enable such pages of memory to be more freely migrated within the memory despite the presence of IO devices that may not themselves properly handle migrating pages of memory. Migrating these pages of memory can help to ensure that the pages of memory are in desirable locations in the memory. This can improve the operation of the memory, which in turn improves the operation of the processor and the IO devices that use the pages of memory in the memory.

Electronic Device

FIG. 1 presents a block diagram illustrating an electronic device 100 in accordance with some embodiments. As can be seen in FIG. 1, electronic device 100 includes processor 102, memory 104, mass storage 106, input-output (IO) devices 108-110, input-output (IO) hub 112, and page migration engine 114. Processor 102, memory 104, mass storage 106, IO devices 108-110, IO hub 112, and page migration engine 114 are all implemented in "hardware," i.e., using corresponding integrated circuitry, discrete circuitry, and/or devices. For example, in some embodiments, processor 102, memory 104, mass storage 106, IO devices 108-110, IO hub 112, and page migration engine 114 are implemented in integrated circuitry on one or more semiconductor chips, are implemented in a combination of integrated circuitry on one or more semiconductor chips in combination with discrete circuitry and/or devices, or are implemented in discrete circuitry and/or devices. In FIG. 1, electronic device 100 is partially shaded to enable the various figure elements to be more easily distinguished.

Processor 102 is a functional block that performs computational, memory access, control, and/or other operations in electronic device 100. Processor 102 includes cores 116-118, each of which includes one or more central processing unit (CPU) cores, graphics processing unit (GPU) cores, embedded processors, application specific integrated circuits (ASICs), and/or other computational functional blocks.

Processor 102 includes cache memories, or "caches," which are functional blocks that are used for storing copies of data that can be used by cores 116-118 for performing various operations. As can be seen in FIG. 1, the caches in processor 102 include level-one (L1) caches 120-122 (L1 120 and L1 122) in cores 116-118, respectively. Each of L1 caches 120-122 includes memory circuitry for storing data and control circuitry for handling accesses of data stored in the memory circuitry. Processor 102 also includes shared level-two (L2) cache 124 and level three (L3) cache 126 that each include memory circuitry for storing data and control circuitry for handling accesses of data stored in the memory circuitry.

Processor 102 includes platform security processor (PSP) 128, which is a functional block that is used for performing security-related operations in electronic device 100. For example, in some embodiments, PSP 128 includes a CPU core, an ASIC, and/or a microcontroller. PSP 128 includes circuitry that is designed to be secure against specified malicious or erroneous behaviors of other functional blocks and devices in processor 102 and/or software entities executed by processor 102. PSP 128 can therefore be used for securing the operations of other functional blocks, devices, and/or software entities that are susceptible to such behavior. In other words, PSP 128 can perform operations associated with enabling a trusted execution environment in electronic device 100. To this end, PSP 128 may perform operations for encryption/decryption (e.g., key generation, encryption/decryption of data, etc.), registration and/or authentication of hardware and/or software entities, access permission verification, etc. In some embodiments, PSP 128 performs at least some of the operations described herein for handling the migration of pages that are accessible to IO devices 108-110. For example, a software entity may communicate a request to migrate a page of memory to PSP 128, which then verifies that the move of the page of memory is permitted (i.e., that the software entity is allowed to move the particular page of memory to a destination location in the memory, etc.) before forwarding the request to migrate the page of memory to page migration engine 114 for subsequent processing.

Memory 104 is a functional block that is used for storing data for other functional blocks in electronic device 100. For example, in some embodiments, memory 104 is a "main" memory in electronic device 100. Memory 104 includes memory circuitry for storing data and control circuitry for handling accesses of data stored in the memory circuitry.

In some embodiments, memory 104 includes two or more different types of memory that are arranged so that different portions of a set of addressable locations in memory 104 are in each of the types of memory. For example, in some embodiments, half of the addressable locations are in a first type of memory, and thus are implemented using a first type of memory circuitry, and half of the addressable locations are in a second type of memory, and thus are implemented using a second type of memory circuitry. The use of two types of memory is illustrated in FIG. 1 via type of memory 130 and type of memory 132. For example, type of memory 130 can be fifth generation double data rate synchronous dynamic random access memory (DDR5 DRAM) or another type of memory and type of memory 132 can be 3D crosspoint (3D XPoint) memory or another type of memory. Each type of memory has respective memory characteristics. For example, the memory characteristics can include some or all of access speed/latency, access bandwidth, data protection/verification/error correction, reliability/mean time between failures, electrical power consumption, heat generation, data addressability (e.g., byte or block addressability), data compatibility/specification, monetary cost, design complexity, etc.

Mass storage 106 is a functional block and/or device that stores data for use by other functional blocks and devices in electronic device 100. For example, mass storage 106 can be or include a semiconductor memory, a disk drive, an optical drive, etc. Mass storage 106 includes circuitry and/or devices that retain stored data despite electrical power for mass storage 106 being shut off (or otherwise reduced) and thus serves as non-volatile "long term" storage for data. At runtime (i.e., as electronic device 100 operates), copies of data are acquired from mass storage 106 and stored in volatile memory 104 (and possibly one or more caches) for subsequent use by functional blocks in electronic device 100. For example, data may be acquired/read from mass storage 106 in blocks or pages a given size (e.g., 4 KiB, 2 MiB, 1 GiB, etc.) and the pages stored in memory 104—as "pages of memory." In addition, pages of memory that are created by other functional blocks and devices in electronic device 100 may stored in memory 104 (e.g., for storing computational results, files, configuration values, etc.) and eventually written out to mass storage 106. While stored in memory 104, pages of memory can be accessible to the other functional blocks and devices in accordance with access rules and permissions for the pages of memory and/or the data therein.

Returning to processor 102, memory management unit (MMU) 134 is a functional block that handles memory access requests and requests for information from page tables. When data is to be accessed by a functional block in processor 102, the functional block sends a memory access request to MMU 134. For example, a software entity (e.g., a program, an operating system, etc.) being executed by core 116 may cause a load/store unit in processing circuitry in core 116 to send a memory access request (e.g., for a load or store of data, etc.) to MMU 134. MMU 134 then sends a corresponding memory access request to one or more of L2 cache 124, L3 cache 126, and memory 104 for satisfaction or resolution of the memory access request. For example, if data is to be loaded, MMU 134 may acquire the data from L2 cache 124, L3 cache 126, or memory 104 and forward the data to the requesting functional block. This may mean loading one or more pages of memory that include the data from mass storage 106 to memory 104, should the data not already be present in memory 104.

MMU 134 includes table walker (TW) 136, which is a functional block that performs operations relating to acquiring address translation information and other information from page tables via page table walks. For example, as described in more detail above, in some embodiments, electronic device 100 uses virtual memory to enable software entities (e.g., executed by cores 116-118) to access memory using virtual addresses that are translated into physical addresses. Upon receiving a memory access request from a software entity with a virtual address, table walker 136 performs page table walk operations for translating the virtual address into the physical address for the pages where data is located in memory 104. During page table walk operations, table walker 136 may also check page table entries and/or other records to ensure that the functional block and/or software entity that is requesting each memory access is permitted to perform such an access, i.e., is allowed to access the memory at the physical address, etc. and that the page table and other records used for the translation have not been tampered with or impermissibly modified. In some embodiments, table walker 136 also checks migration state information in page table entries as part of the operations described herein for handling the migration of pages.

An example of the above-described page table is shown as page table 148 in FIG. 1. Generally, page table 148 is a record having an entry, or a "page table entry," with virtual address to physical address translation information and other information for each page of data that is currently stored in memory 104. Page table 148 includes, in each page table entry, respective migration state information that is used for handling the migration of pages of memory as described herein. Although shown as a single entity in FIG. 1, in some embodiments, page table 148 is or includes multiple separate page sub-tables that are used in combination for performing virtual address to physical address translations. In addition, in some embodiments, page table 148 includes or is included in a hierarchy of page tables (e.g., host page tables, IOMMU page tables, etc.) that are used for performing virtual address to physical address translations for virtual machines and IO devices, etc.—i.e., that are used for performing multiple translations for guest virtual addresses, host virtual addresses, and host physical addresses. For example, in some embodiments, page table 148 includes a host page table that is used by processor 102 for performing virtual address to physical address translations (and other operations) for software entities executing on processor 102 and an IOMMU page table that is used by IOMMU 140 for performing virtual address to physical address translations (and other operations) for IO devices 108-110. For clarity, a single page table is used in examples herein—although multiple page tables, a hierarchy of page tables, and/or separate page tables can be used in some embodiments with corresponding adjustments to the operations described herein.

MMU 134 includes translation lookaside buffer (TLB) 138, which is a functional block that is used for storing copies of information acquired from page table entries. TLB 138 includes memory circuitry for a cache that stores copies of page table entries or portions thereof acquired during page table walks by table walker 136 (or from other sources). In order to avoid performing page table walks, when possible, MMU 134 acquires address translation information and/or other page table entry information from TLB 138. If address translation information and/or other page table entry information is not present in TLB 138, however, table walker 136 performs a table walk to acquire the information. In some embodiments, specified information in TLB 138 is invalidated before corresponding pages are migrated as described herein.

Input-output (IO) devices 108-110 are functional blocks or devices that interact with processor 102 and other functional blocks and devices in electronic device 100. Processor 102 and the other functional blocks can therefore receive "input" data from or send "output" data to IO devices 108-110. IO devices 108-110 may also interact with functional blocks or devices external to electronic device 100. For example, input-output devices 108-110 can include network interface devices, disk controllers, devices coupled to corresponding wired or wireless buses or interfaces (e.g., a Peripheral Controller Interface Express (PCIe) bus, a Universal Serial Bus (USB), a WiFi network, etc.), graphics processing units, etc. The particular operations performed by each of IO devices 108-110 depends on the nature of each IO device. For example, if IO device 108 is a disk controller, IO device 108 may retrieve data from a disk (e.g., mass storage 106) and write data into memory 104 or vice versa. As another example, if IO device 110 is a network interface device, IO device 110 may store data received via a network (not shown) in memory 104, acquire data from memory 104 to be transmitted to a receiving device over the network, provide data to or acquire data from processor 102, etc.

IO hub 112 is a functional block or device that performs operations for interfacing between IO devices 108-110 and other functional blocks in electronic device 100. In other words, IO hub 112 performs operations for routing communications and other data between IO devices 108-110 and functional blocks such as processor 102, memory 104, etc. The particular communications that are routed by IO hub 112 and the operations that are performed for routing the communications depend on the nature of IO devices 108-110, but can include memory accesses, data communications, control and configuration communications, etc.

IO hub 112 includes input-output memory management unit (IOMMU) 140, which is a functional block that performs operations for handling memory accesses by IO devices 108-110. When data in memory 104 is to be accessed by an IO device, an IO device transmits a corresponding memory access request. IOMMU 140 intercepts the memory access request from the IO device, processes the request internally to determine whether the memory access request can proceed, and then (assuming that the memory access request can proceed) sends a corresponding request to memory 104 to access the data.

Among the operations performed by IOMMU 140 for processing memory access requests from IO devices 108-110 is performing address translations for memory accesses for IO devices 108-110 (i.e., for acquiring physical addresses in memory associated with virtual addresses used by IO devices 108-110 in memory access requests). IOMMU 140 includes input-output table walker (IOTW) 142, which a functional block that performs operations relating to acquiring address translations from page tables (e.g., page table walks, etc.). The operations performed by input-output table walker 142 are similar to those performed by table walker 136, albeit for memory accesses from IO devices 108-110 (rather than processor 102). In some embodiments, along with performing address translations, input-output table walker 142 also checks metadata and page information such as migration state information to determine whether memory accesses from IO devices 108-110 are permitted in pages of memory and/or whether the page of memory is being migrated as described herein. In these embodiments, input-output table walker 142 can block or otherwise handle memory accesses to avoid improper memory accesses or memory accesses to pages that are being migrated. In some embodiments, input-output table walker 142 uses, and thus performs table walks in, a hierarchy of page tables that includes a page table associated with IOMMU 140, a host page table, and/or a nested page table associated with a software entity (e.g., with a hypervisor, a virtual machine, etc.).

IOMMU 140 also includes translation lookaside buffer (TLB) 144, which is a functional block that is used for storing copies of information acquired from page table entries. TLB 144 includes memory circuitry for a cache that stores copies of page table entries or portions thereof acquired during page table walks by table walker input-output table walker 142 (or from other sources). In order to avoid performing page table walks, when possible, IOMMU 140 acquires address translation information and/or other page table entry information from TLB 144. If address translation information and/or other page table entry information is not present in TLB 144, however, input-output table walker 142 performs a table walk to acquire the information. In some embodiments, specified information in TLB 144 is invalidated before corresponding pages are migrated as described herein.

In some embodiments, some or all of IO devices 108-110 include local caches for storing copies of information acquired from page table entries. For example, in some embodiments, some or all of IO devices 108-110 and IOMMU 140 provide support for the address translation service (ATS), under which IOMMU 140 can provide copies of information acquired from page table entries to IO devices 108-110 for caching therein. An example of such a cache is shown as address translation cache (ATC) 146 in IO device 108. ATC 146 includes memory circuitry for a cache that stores copies of page table entries or portions thereof acquired during page table walks by input-output table walker 142 (or from other sources). In order to avoid performing page table walks, when possible, IO device 108 acquires address translation information and/or other page table entry information from ATC 146. If address translation information and/or other page table entry information is not present in ATC 146, however, input-output table walker 142 performs a table walk to acquire the information (or uses cached information from TLB 144). In some embodiments, specified information in ATC 146 is invalidated before corresponding pages are migrated as described herein.

In some embodiments, although shown as a single entity in FIG. 1, IOMMU 140 includes multiple separate IOMMUs (e.g., multiple instances of an IOMMU functional block). For example, in some embodiments, electronic device 100 includes at least two IOMMU functional blocks, each IOMMU functional block controlling memory accesses by a subset of a set of IO devices in electronic device 100. In these embodiments, the IOMMUs work together, or through a "master" IOMMU or other functional block, to ensure that the IOMMUs are using information in a page table and accessing memory for IO devices properly—including in the presence of migrating pages of memory as described herein. For example, IOMMUs can broadcast, on a communication link to which all IOMMUs are connected, requests and acknowledgements of TLB invalidations, memory access completions or halts, etc. to ensure that all of the IOMMUs are synchronized before a given IOMMU performs an operation such as accessing information in a page table entry, allowing a memory access from an IO device to proceed, etc.

Page migration engine 114 is a functional block that performs operations associated with accessing data in memory 104. Page migration engine 114 can be used for offloading memory access operations from other functional blocks in electronic device 100. For example, in some embodiments, page migration engine 114 offloads, and thus receives and performs, memory accesses on behalf of cores 116-118, which enables cores 116-118 to avoid themselves performing memory access operations. In some embodiments, page migration engine 114 includes, among other functional blocks, one or more direct memory access (DMA) functional blocks that perform operations for moving pages of memory within memory 104. Among the memory access operations performed by page migration engine 114 is "migrating" pages of memory in memory 104. For migration, upon receiving a request from one of cores 116-118 (e.g., from an operating system being executed by core 116, etc.) or from another source, such as PSP 128, that identifies a page of memory and a new location in memory where the page of memory is to be stored, page migration engine 114 moves the page of memory to the new location (i.e., physically moves the individual bits/bytes in the page of memory to the new location in one or more data movement operations). Along with migrating pages of memory, page migration engine 114 performs operations for handling the migration of pages of memory that are accessible to IO devices as described herein.

In some embodiments, although shown as a single entity in FIG. 1, page migration engine 114 includes multiple separate page migration engines (e.g., multiple instances of a page migration engine functional block). For example, in some embodiments, page migration engine 114 includes at least two page migration engines, each page migration engine arranged to perform memory accesses on behalf of other functional blocks in electronic device 100—including migrating pages of memory as described herein. In these embodiments, page migration tasks/requests are distributed among the two or more page migration engines in accordance with a distribution scheme (e.g., round robin, by memory address or location in memory, etc.) and the page migration engines may coordinate accesses to avoid specified memory accesses, etc.

In some embodiments, communication paths are coupled between the functional blocks in electronic device 100 as shown by arrow-headed lines between the functional blocks. Communication paths include one or more busses, wires, guides, and/or other connections possibly along with controllers, fabric elements (e.g., switches, routers, etc.), etc. The communication paths are used to route commands, data, control signals, and/or other information between functional blocks. For example, in some embodiments, an interconnect fabric is coupled between IO hub 112, processor 102 (e.g., MMU 134), and memory 104. Note that some communication paths are not shown in FIG. 1 for clarity.

Although electronic device 100 is shown in FIG. 1 with a particular number and arrangement of functional blocks and devices, in some embodiments, electronic device 100 includes different numbers and/or arrangements of functional blocks and devices. For example, in some embodiments, processor 102 includes a different number of cores. As another example, in some embodiments, a different number and/or arrangement of caches is present in processor 102. As yet another example, in some embodiments, IO device 108 does not include an address translation cache—or both IO devices 108-110 include translation caches. Generally, in the described embodiments, electronic device 100 includes sufficient numbers and/or arrangements of functional blocks to perform the operations herein described.

Electronic device 100 and processor 102 as shown in FIG. 1 are simplified for illustrative purposes. In some embodiments, however, electronic device 100 and/or processor 102 include additional or different elements and mechanisms for performing the operations herein described and other operations. For example, electronic device 100 and/or processor 102 may include power functional blocks or devices, human interface functional blocks or devices, etc.

In some embodiments, functional blocks shown separately in FIG. 1 are implemented together. For example, in some embodiments, some or all of IO hub 112 and IO devices 108-110 are incorporated in/with processor 102, such as being fabricated on the same integrated circuit chip. In other words, for such embodiments, IO hub 112 and IO devices 108-110 may be integrated with processor 102 (e.g., as a "system on a chip" or in another form). Alternatively, in some embodiments, functional blocks that are shown as part of other functional blocks may be separate. For example, in some embodiments, platform security processor 128 is implemented separately from processor 102.

Figure 2:
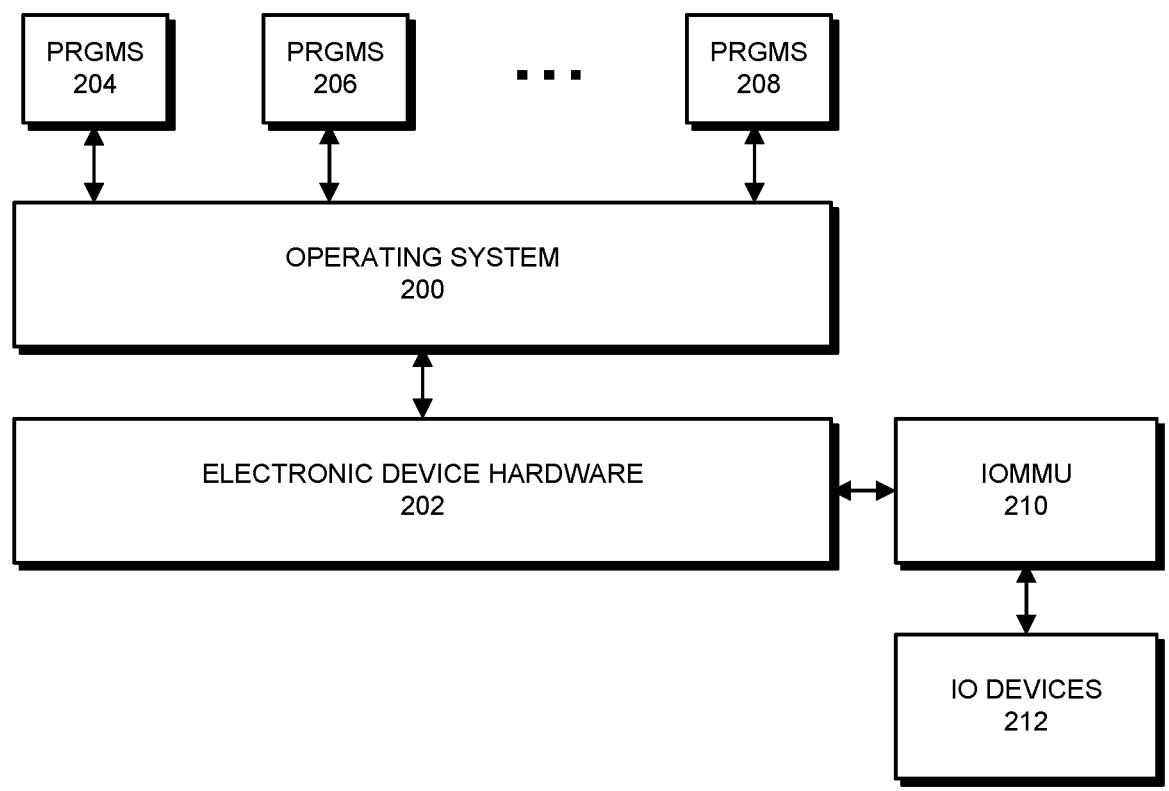
FIG. 2 presents a block diagram illustrating an operating system and functional blocks and devices in an electronic device in accordance with some embodiments.

Electronic device 100 can be, or can be included in, any electronic device that performs computational operations. For example, electronic device 100 can be, or can be included in, desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof Operating System In some embodiments, one or more software entities interact with functional blocks in an electronic device for performing operations for handling the migration of IO device accessible pages of memory in a memory. In some of these embodiments, the one or more software entities are or include an operating system. FIG. 2 presents a block diagram illustrating an operating system and functional blocks and devices in an electronic device in accordance with some embodiments. Note that FIG. 2 is simplified and generally shows the relationship of an operating system with electronic device hardware. In some embodiments, some or all of the elements shown in FIG. 2 are not present and/or are arranged differently.

As can be seen in FIG. 2, operating system 200 interfaces between electronic device hardware 202 (i.e., between the functional blocks and devices of electronic device 100 such as processor 102, etc.) and a set of programs 204-208. For example, operating system 200 may be an operating system such as Windows® from Microsoft of Redmond, Wash., macOS® from Apple, Inc. of Cupertino, Calif., etc. and programs 204-208 may each be a productivity application, a scientific computing application, a web browser, etc. IOMMU 210 interfaces between IO devices 212 and electronic device hardware 202 (e.g., memory 104, etc.). In some embodiments, the functional blocks and devices in FIG. 2, i.e., electronic device hardware 202, IOMMU 210, and IO devices 212, are similar to hardware in electronic device 100 (e.g., processor 102, memory 104, page migration engine 114, etc.), IOMMU 140, and IO devices 108-110, respectively, as shown in FIG. 1.

Virtual Machines and Hypervisor

Figure 3:
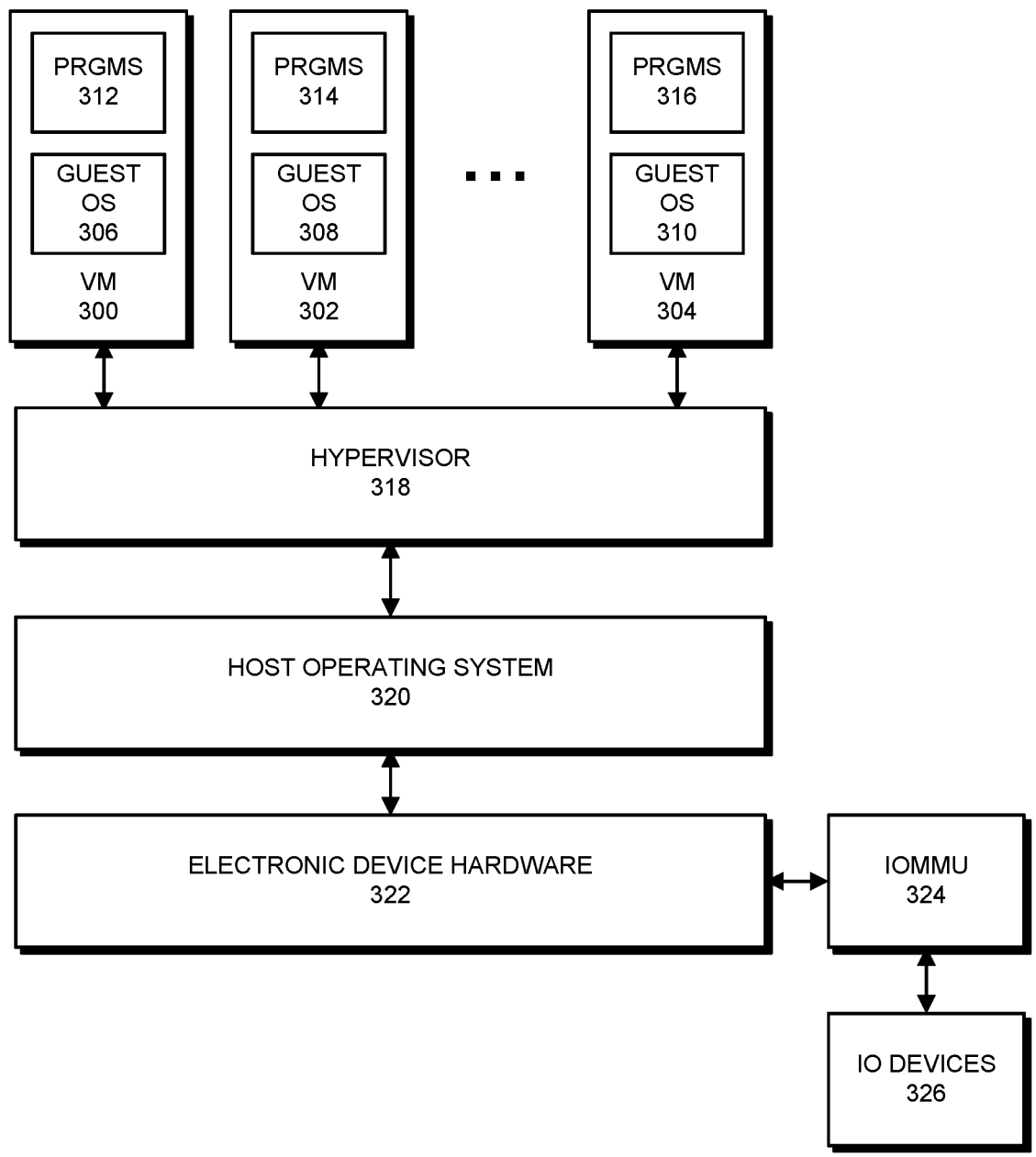
FIG. 3 presents a block diagram illustrating a hypervisor and functional blocks and devices in an electronic device in accordance with some embodiments.

In some embodiments, one or more software entities interact with functional blocks in an electronic device for performing operations for handling the migration of IO device accessible pages of memory in a memory. In some of these embodiments, the one or more software entities are or include a hypervisor. Generally, in some embodiments, a processor in an electronic device executes one or more virtual machines. Virtual machines are software entities that emulate or otherwise interface with the processor and other functional blocks and devices in the electronic device (e.g., memories, IO devices, etc.) in order to provide support for executing software programs. For example, a virtual machine may provide support for running one or more instances of operating systems, called guest operating systems. The guest operating systems in turn provide support for executing other software programs such as applications, databases, etc. In some embodiments, the processor also executes a hypervisor, which is a software entity that performs operations for controlling/managing the execution of virtual machines. For example, the hypervisor may start and initialize virtual machines, assist with controlling accesses of functional blocks and devices in the electronic device by virtual machines (e.g., dictate which regions of memory and/or IO devices the virtual machines are allowed to access, etc.), terminate or close virtual machines, etc. FIG. 3 presents a block diagram illustrating a hypervisor and functional blocks and devices in an electronic device in accordance with some embodiments. Note that FIG. 3 is simplified and generally shows the relationship of a hypervisor with electronic device hardware. In some embodiments, some or all of the elements shown in FIG. 3 are not present and/or are arranged differently.

As can be seen in FIG. 3, there are three virtual machines (VM) 300-304, on each of which executes a respective guest operating system (GUEST OS) 306-310 and one or more programs (PRGRMS) 312-316. Hypervisor 318 interfaces between a host operating system 320 and virtual machines 300-304. Host operating system 320 interfaces between electronic device hardware 322 and hypervisor 318. IOMMU 324 interfaces between IO devices 326 and electronic device hardware 322. In some embodiments, the functional blocks and devices in FIG. 3, i.e., electronic device hardware 322, IOMMU 324, and IO devices 326, are similar to hardware in electronic device 100 (e.g., processor 102, memory 104, page migration engine 114, etc.), IOMMU 140, and IO devices 108-110, respectively, as shown in FIG. 1.

Page Table Entries

Figure 4:
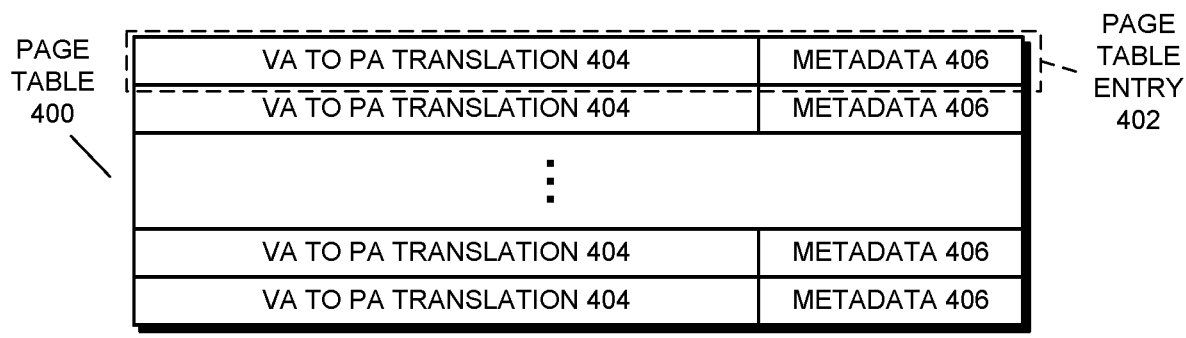
FIG. 4 presents a block diagram illustrating a page table in accordance with some embodiments.

In the described embodiments, functional blocks and devices in an electronic device (e.g., processor 102, IOMMU 140, etc.) use one or more page tables for performing virtual address to physical address translations and for other operations. FIG. 4 presents a block diagram illustrating a page table 400 in accordance with some embodiments. As can be seen in FIG. 4, page table 400 includes a number of page table entries 402 (one of which is highlighted using a dashed line), each of which can store a virtual address (VA) to physical address (PA) translation 404 along with corresponding metadata 406. In some embodiments, page table 148 in FIG. 1 is internally arranged similarly to page table 400.

Generally, as pages of memory (i.e., blocks, sections, or portions of memory of a specified size, such as 4 KiB, 2 MiB, etc.) are retrieved from mass storage 106 and stored in memory 104 or newly created in memory 104, corresponding page table entries 402 are added to page table 400 with virtual address to physical address translations 404 and metadata 406. Thus, if a page of memory is available in memory 104, page table 400 should include a corresponding page table entry 402. The page table entries 402 are added to page table 400 to enable keeping track of the relationship between the physical addresses of the pages in memory and the virtual addresses used by software entities (e.g., programs, firmware, operating systems, etc.) and devices for accessing the pages of memory as described above.

In some embodiments, the virtual address to physical address translation 404 in each page table entry 402 in page table 400 includes information that can be used for determining a physical address of a corresponding page in memory that is associated with one or more virtual addresses. In other words, each virtual address to physical address translation 404 includes information that can be used to identify a location in memory 104 for a page of memory that is addressed by software entities and/or devices using respective virtual addresses. For example, in some embodiments, each virtual address to physical address translation 404 includes a first field with some or all of one or more virtual addresses (e.g., N of M bits of each virtual address, where N<=M) and a second field with some or all of a physical address to which the one or more virtual addresses map/match.

Figure 5:
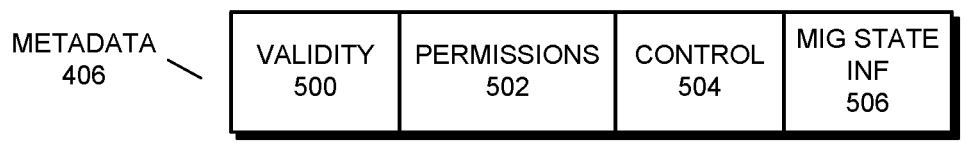
FIG. 5 presents a block diagram illustrating metadata in a page table entry in accordance with some embodiments.

Metadata 406 includes information associated with, characterizing, controlling, and/or otherwise relevant to the corresponding virtual address to physical address translation 404. As translation information for a page of memory is added to an page table entry 402 in page table 400, metadata is acquired, generated, etc. and added to that page table entry 402. FIG. 5 presents a block diagram illustrating metadata 406 in a page table entry in accordance with some embodiments. As can be seen in FIG. 5, metadata 406 includes validity 500, permissions 502, control 504, and migration state information (MIG STATE INF) 506. Validity 500 includes one or more values that relate to the validity of the page table page table entry 402, the virtual address to physical address translation 404 in that page table page table entry 402, and/or the corresponding page of memory in memory 104. For example, validity 500 may include one or more bits indicating whether the page table entry 402 is itself valid/accessible and/or whether the corresponding page in memory 104 is valid/accessible.

Permissions 502 includes one or more values that relate to access permissions for the corresponding page in memory 104. For example, permissions 502 may include one or more bits that indicate whether the corresponding page in memory 104 has read-only or read-write permissions set, whether the page is only accessible with particular privileges (administrator, user, kernel, etc.), and/or other permissions information.

Control 504 includes one or more values that relate to the use of the page table entry 402 and/or the corresponding page in memory 104. For example, control 504 may include a page size indicator, a dirty indicator (for when the corresponding page in memory 104 has been modified and is therefore inconsistent with the associated block of memory in mass storage 106), an accessed indicator (for when the page in memory 104 has been accessed one or more times), a write-through indicator (for when modifications to the page in memory 104 are to be reflected immediately in the associated block of memory on mass storage 106), and/or other values.

Migration state information 506 includes one or more values that indicate whether (or not) preparations are being made for migrating the associated page or the associated page is being migrated. For example, in some embodiments, migration state information includes a number of bits sufficient to uniquely identify each possible migration state for a corresponding page of memory. For instance, if there are six migration states, with a first migration state being for pages that are not being migrated, a sixth migration state being for pages that are actively being migrated, and the four intermediary migration states being for various preparation operations for preparing to migrate pages of memory, the migration state information can be stored in three bits. A functional block or device that accesses a page table entry can use migration state information 506 to decide what operations are permitted (or not) for the page of memory and/or the information in the corresponding page table page table entry 402. For example, in some embodiments, when the migration state indicates that preparations are being made for migrating the page of memory or the page of memory is being migrated, an accessing functional block or device can determine that copies of information from the page table entry are not permitted to be cached in local caches and/or that some or all of memory accesses to the page of memory are restricted.

In some embodiments, one or both of virtual address to physical address translation 404 and metadata 406 may be modified/changed, updated, etc. after being added to page table 400. For example, when a page is moved from a first location to a second location in memory 104, a virtual address to physical address translation 404 in the corresponding page table entry 402 can be updated. As another example, in an embodiment where metadata 406 includes permissions 502 (e.g., read/write permissions), permissions 502 can be updated to indicate the read only, read-write, etc. permissions for the corresponding page in memory 104. As yet another example, migration state information 506 can be updated as functional blocks and devices proceed through migration states for migrating a page of memory.

As described above, when attempting to acquire physical address information or metadata for a specified virtual address, MMU 134, IOMMU 140, or another entity in electronic device 100 can perform a page table walk. During the page table walk, MMU 134, IOMMU 140, etc., search page table 400 to find an page table entry 402, should such an page table entry 402 exist, in which a corresponding virtual address to physical address translation 404 is held. Upon encountering such an page table entry 402, MMU 134, IOMMU 140, etc. acquire, from the page table entry 402, the physical address for the specified virtual address (i.e., from the virtual address to physical address translation 404 in the page table entry 402) or the metadata. If MMU 134, IOMMU 140, etc. is unable to find a corresponding page table entry 402, an error-handling operation is performed (e.g., a page fault is emitted and subsequently processed, etc.). In the described embodiments, functional blocks and devices in an electronic device (e.g., an IOMMU, page migration engine, etc.) perform operations for preventing IO devices from encountering issues with missing or unavailable page table entries—or the corresponding pages of memory—due to the migration of the corresponding pages of memory. For example, in some embodiments, when determining a virtual address to physical address translation for a memory access request, input-output table walker 142 checks the migration state information 506 in the respective page table entry 402 to determine if the virtual address to physical address translation 404 is allowed to be cached by IOMMU 140 and/or IO devices 108-110 and/or if the memory access is to be stalled due to the present migration state.

Although page table 400 is shown with a particular number of page table entries 402, some embodiments include a different number of page table entries 402 (as shown by the ellipsis in FIG. 4). In addition, although page table entry 402 and metadata 406 are shown with particular arrangements and types of information, in some embodiments, one or both of page table entry 402 and metadata 406 include different information. For example, in some embodiments, at least some of the above-described metadata is stored in a location other than in an page table entry 402. For instance, in some embodiments, a separate in-memory data structure is used for storing the migration state information. Generally, page table 400 includes sufficient information to enable functional blocks and devices in an electronic device to store and retrieve virtual address to physical address translation information and metadata as described herein.

Although page table 400 is shown as a single page table, in some embodiments, page table 400 is organized differently. For example, in some embodiments, page table 400 is implemented using two or more sub-tables arranged in a hierarchy. In these embodiments, a search of each sub-table directs a searching functional block or device to a next sub-table in the hierarchy until a final sub-table is reached in which the virtual address to physical address translation 404 and metadata 406 are stored in a corresponding page table entry 402.

Migration States

In some embodiments, as preparations are made for migrating pages of memory and the pages of memory are then migrated, functional blocks, devices, and/or software entities in an electronic device (e.g., IOMMU 140, page migration engine 114, processor 102, operating system 200, and/or hypervisor 318) proceed through migration states from among a set of migration states. Aside from an initial non-migrating migration state, in each of the migration states, respective operations are performed for preparing to migrate pages of memory and/or for migrating the pages of memory. Requests for accesses of pages of memory that are to be or are being migrated and/or of information in the respective page table entries are handled by functional blocks and devices in the electronic device (e.g., IOMMU 140, page migration engine 114, etc.) based on the current migration state of the pages of memory. Generally, the requests are handled in such a way that functional blocks and devices continue to operate correctly while the operations of each migration state are performed. For example, IO devices (e.g., IO devices 108-110) and/or a processor (e.g., processor 102) are protected from errors and faults that could arise from accesses of the migrating pages of memory and/or the respective page table entries.

Figure 6:
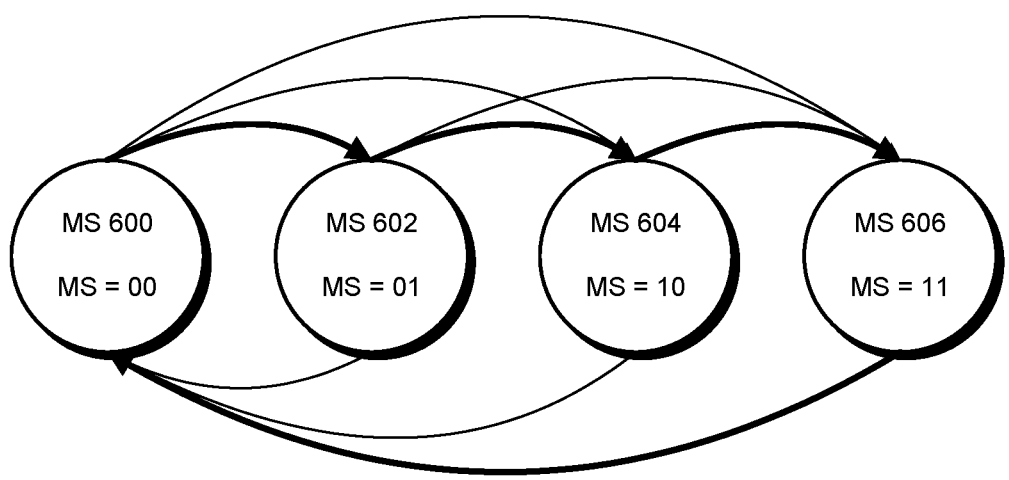
FIG. 6 presents a state diagram illustrating migration states in accordance with some embodiments.

FIG. 6 presents a state diagram illustrating migration states in accordance with some embodiments. Generally, the migration states shown in FIG. 6 are an example of migration states through which functional blocks, devices, and/or software entities in an electronic device (e.g., electronic device 100) can proceed as preparations are made for migrating pages of memory and the pages of memory are then migrated. Although a particular number and arrangement of migration states and transitions between the migration states are shown in FIG. 6, in some embodiments, different numbers and/or arrangements of migration states can be used and/or different transitions between the migration states can be used.

In FIG. 6, transitions between migration states are shown using arrow-headed lines between migration states. A first set of transitions between the migration states is shown using thicker lines, while other transitions between the migration states are shown using thinner lines. In the following description, the first set of transitions between the migration states is described and then the other transitions between the migration states are described. Note, however, that the use of different line thicknesses is merely for clarity in describing the migration states and the transitions between the migration states.

As can be seen in FIG. 6, the migration states include migration states (MS) 600-606. In migration state 600, which is a "non-migrating" migration state, a page of memory is not being migrated and thus will remain in a current location in memory. Migration state 600 is therefore the migration state in which the page of memory is maintained until the page of memory is to be migrated (and, more generally, pages of memory are kept until the pages of memory are to be migrated). In migration state 600, migration state information in a page table entry for the page of memory (e.g., migration state information 506) is set to a bit sequence, value, etc. that represents or identifies the page of memory as being in migration state 600. For example, assuming that the migration state information includes two bits, migration state information (MS) can be set to 00 to represent or identify migration state 600.

In migration state 600, because the migration state information in the page table entry identifies the page of memory as being in migration state 600, the IOMMU allows accesses of the page of memory and the respective information in the page table entry from the IO devices to proceed normally. That is, because preparations for migrating the page of memory are not being made and the page of memory is not being migrated, accesses of the page of memory and the information in the page table entry are not prevented, stalled, or otherwise restricted by the IOMMU. In other words, in migration state 600, the IOMMU uses information from the page table entry normally and performs memory accesses of the page of memory normally.

In some embodiments, however, although accesses of the page of memory and the respective page table entry are not restricted due to the migration of the page of memory in migration state 600, other restrictions relating to accesses of the page of memory and the information in the page table entry can still be enforced. For example, if a page of memory is not accessible to an IO device due to the page of memory being a private page of memory that is not ordinarily accessible to the IO device, being in migration state 600 does not change such an access restriction.

Upon encountering a request to migrate the page of memory from a software entity (e.g., a hypervisor, an operating system, etc.) or forwarded from a platform security processor (e.g., PSP 128), the functional blocks, devices, and software entities proceed to migration state 602 (as shown via the thick arrow-headed line between migration states 600 and 602). When entering migration state 602, the software entity sets migration state information in the page table entry for the page of memory to a bit sequence, value, etc. that represents or identifies migration state 602. For example, assuming that the migration state information includes two bits, migration state information can be set to 01 to represent or identify migration state 602.

In migration state 602, initial preparations are made for migrating the page of memory in the memory. The preparations include the IOMMU preventing the caching (i.e., storage) of new copies of information from the page table entry for the page of memory in local caches in the IOMMU and/or the IO devices (e.g., TLB 144, ATC 146, etc.). Generally, because the subsequent migration of the page of memory will render copies of information from the page table entries incorrect due to the page of memory being located at a new physical address in memory, copies of the information from the page table entry are prevented from being stored in the local caches in the IOMMU or the IO devices until the page of memory has been migrated and the page table entry updated. In migration state 602, therefore, because the migration state information in the page table entry identifies the page of memory as being in migration state 602, the IOMMU will not acquire copies of information from the page table entry in order to cache such copies in the local cache in the IOMMU itself and/or for providing such copies to IO devices for storage in local caches in the IO devices.

In some embodiments, when not providing copies of information from the page table entry to IO devices, the IOMMU denies ATS requests from IO devices for copies of information from the page table entry. For example, in some embodiments, the IOMMU can respond to ATS requests by informing the requesting IO device that the page of memory is not present, which causes the IO device to proceed with operations for making the page present. As another example, the IOMMU can inform requesting IO devices that untranslated addresses should be used for accessing the page of memory—thereby not providing information from the page table entry to the requesting IO devices.

In migration state 602, the software entity also causes the IOMMU to invalidate any existing copies of the information from the page table entry in local caches in the IO devices, e.g., in address translation caches (ATCs). By invalidating these entries, subsequent invalidations and/or modifications of copies of the information from the page table entry in the local caches in the IO devices are avoided. Note, however, that a copy of the information from the page table entry in a local cache in the IOMMU, which can still be needed for performing memory accesses in migration state 602 and subsequent migration states, is retained in migration state 602—and eventually invalidated in a subsequent migration state (i.e., migration state 604).

In migration state 602, and in contrast to subsequent migration states (i.e., migration states 604 and 606), the IOMMU permits memory accesses from the IO devices to the page of memory to proceed without restriction. In other words, both existing/outstanding memory accesses and newly encountered memory accesses from the IO devices are permitted to proceed. Allowing the memory accesses to proceed clears up/completes memory accesses of the page of memory in preparation for migrating the page of memory (as the page of memory should not be migrated with memory accesses outstanding) without unnecessarily delaying operations of the IO devices.

From migration state 602, the functional blocks, devices, and software entities proceed to migration state 604 (as shown via the thick arrow-headed line between migration states 602 and 604). For example, after performing the operations of migration state 602, the software entity can request that the page migration engine migrate the page of memory to cause the entry to migration state 604. When entering migration state 604, the page migration engine sets the migration state information in the page table entry for the page of memory to a bit sequence, value, etc. that represents or identifies migration state 604. For example, assuming that the migration state information includes two bits, migration state information can be set to 10 to represent or identify migration state 604.

In migration state 604, preparations continue to be made for migrating the page of memory in the memory. The preparations include the IOMMU stalling newly encountered memory accesses of a first type from the IO devices to the page of memory. For example, in some embodiments, the first type of memory accesses includes memory accesses such as reads, compare and swaps, etc. that cause a response (e.g., returned data, etc.) from the memory to a requesting IO device—in contrast to a second type of memory accesses such as writes, invalidations, etc. that do not cause a response. In migration state 604, therefore, because the migration state information in the page table entry identifies the page of memory as being in migration state 604, the IOMMU stalls newly encountered memory accesses of the first type until after the migration of the page of memory is completed (e.g., until a return to migration state 600). For example, the IOMMU may hold newly encountered memory accesses of the first type in a buffer, memory element, etc. (e.g., by storing information for a memory access request from an IO device), and subsequently release the held memory accesses from the buffer, memory element, etc. after the migration of the page of memory is completed. Note, however, that existing/outstanding memory accesses of the first type—that were in progress before the entry into migration state 604—are permitted to complete, and memory accesses of the second type, both existing/outstanding and newly encountered, are permitted to proceed. In some embodiments, newly encountered memory accesses of the first type are stalled separately from newly encountered memory accesses of the second type (which are stalled in migration state 606, as described below) to avoid conflicts that may occur between memory accesses of the first and second types, deadlock conditions, and/or other problems.

In migration state 604, the page migration engine invalidates any existing copy of the information from the page table entry in the local cache in the IOMMU (recall that existing copies of the information from the page table entry in local caches in the IO devices were previously invalidated in migration state 602). For example, the page migration engine may issue an invalidation request to the IOMMU that causes the IOMMU to invalidate any existing copy of the information from the page table entry in the local cache. In migration state 604, the IOMMU also continues to prevent the IOMMU and/or IO devices from storing copies of information from the page table entry for the page of memory in local caches as described above for migration state 602.

From migration state 604, the functional blocks, devices, and software entities proceed to migration state 606 (as shown via the thick arrow-headed line between migration states 604 and 606). For example, page migration engine can enter migration state 606 after completing the invalidation of any existing copy of the information from the page table entry in the local cache in the IOMMU in migration state 604. When entering migration state 606, the page migration engine sets the migration state information in the page table entry for the page of memory to a bit sequence, value, etc. that represents or identifies migration state 606. For example, assuming that the migration state information includes two bits, migration state information can be set to 11 to represent or identify migration state 606.

In migration state 606, preparations for migrating the page of memory in the memory are completed and then the page of memory is migrated. The operations include the IOMMU stalling all newly encountered memory accesses from the IO devices to the page of memory. In migration state 606, therefore, because the migration state information in the page table entry identifies the page of memory as being in migration state 606, the IOMMU stalls newly encountered memory accesses of both the first type and the second type until after the migration of the page of memory is completed (e.g., until a return to migration state 600). For example, the IOMMU may hold newly encountered memory accesses of both the first type and the second type in a buffer, memory element, etc. (e.g., by storing information for a memory access request from an IO device), and subsequently release the held memory accesses from the buffer, memory element, etc. after the migration of the page of memory is completed. In migration state 606, the IOMMU also continues to prevent the IOMMU and/or IO devices from storing copies of information from the page table entry for the page of memory in local caches as described above for migration state 602.

In migration state 606, although all newly encountered memory accesses from IO devices are stalled, existing/outstanding memory accesses are completed. In other words, all remaining memory accesses that were in progress before the entry into migration state 606 are completed. All the existing/outstanding memory accesses are completed so that no memory accesses of the page of memory access the page of memory during migration (because outdated/incorrect data could be accessed).

After the existing/outstanding memory accesses are completed, and thus all remaining accesses to the page of memory are stalled in preparation for migrating the pages of memory, the preparations for migrating the page of memory are finished. The page migration engine therefore migrates the page of memory in the memory. For example, the page migration engine can move the page of memory from a first location/physical address in the memory to a second location/physical address in the memory (e.g., a location specified in the request to migrate the page of memory). In some embodiments, the movement in the memory is from a first type of memory (e.g., a slower access type of memory) to a second type of memory (e.g., a faster access type of memory) or vice versa. Although migration state 606 is shown as a single migration state, in another example, migration state could be split into migration state 606A, in which the existing/outstanding memory accesses of the second type are completed, and 606B, in which the page of memory is migrated/moved in memory and the cleanup operations (as described below) are performed in preparation for returning the page of memory to migration state 600.

After migrating the page of memory, the page migration engine updates (or causes another functional block or software entity to update) the page table entry to identify the physical address where the page of memory is stored (i.e., the physical address of the second location in the memory). By updating the page table entry, the page migration engine updates the virtual address to physical address translation information for the page of memory so that virtual addresses used by software entities and devices in the electronic device can be correctly mapped to the physical address where the page of memory is stored. The page migration engine also sets any associated metadata in the page table entry (if necessary) based on the second location in the memory.

Because the page of memory has been migrated successfully, the functional blocks, devices, and software entities return to migration state 600 (as shown via the thick arrow-headed line between migration states 606 and 600). As part of returning to migration state 600, the page migration engine sets the migration state information in the page table entry for the page of memory to a bit sequence, value, etc. that represents or identifies migration state 600. For example, assuming that the migration state information includes two bits, migration state information can be set to 00 to represent or identify migration state 600. As described above, migration state 600 is the "non-migrating" migration state. Because the migration state information in the page table entry identifies the page of memory as being in migration state 600, the IOMMU allows accesses of the page of memory and the respective information in the page table entry from the IO devices to proceed normally. That is, because preparations for migrating the page of memory are not being made and the page of memory is not being migrated, accesses of the page of memory and the information in the page table entry are not prevented, stalled, or otherwise restricted by the IOMMU.

Upon returning to migration state 600, the IOMMU releases stalled memory accesses of the first type and the second type to the page of memory that were previously stalled during migration states 604 and 606. For example, in some embodiments, the IOMMU polls/periodically reads the page table entry while stalled memory accesses are held by the IOMMU. When the IOMMU discovers that the page table entry identifies the page of memory as being in migration state 600, the IOMMU begins to acquire the stalled memory accesses in first-in-first-out order from a buffer or memory element where the stalled memory accesses were stored and performs each of the memory accesses.

In some embodiments, the IOMMU performs each of the stalled memory accesses before other newly encountered memory accesses of the page of memory (which can themselves be held and subsequently released in the order in which they are received or another order). In addition, the IOMMU resumes caching of the information from the page table entry in local caches. In other words, the IOMMU can itself cache a copy of the information from the page table entry and can provide copies of the information from the page table entry to requesting IO devices. The page migration engine also returns a response to the requesting software entity indicating that the page of memory has been successfully migrated. This completes the migration of the page of memory.

For the example in FIG. 6, it is assumed that the attempt at migration is successful—and thus all the operations for preparing to migrate the page and then migrating the page are successful. If one of the operations were to fail or encounter an undesirable or unexpected condition or error, however, the migration of the page can be terminated. When the migration is terminated, the functional blocks, devices, and software entities return from the current migration state (which can be any of migration states 602-606) to migration state 600. This is shown via corresponding thin arrow-headed lines between migration states 602-604 and migration state 600 and a thick arrow-headed line between migration state 606 and migration state 600. Upon terminating the migration of the page of memory, the software entity, the page migration engine, or another functional block or device restores the migration state information in the page table entry for the page of memory to a bit sequence, value, etc. that represents or identifies migration state 600. For example, assuming that the migration state information includes two bits, migration state information can be set to 00 to represent or identify migration state 600. When returning to migration state 600 due to the failure to migrate the page of memory, the IOMMU releases any stalled memory accesses of the page of memory and resumes caching copies of information from the page table entry in local caches in the IOMMU and the IO devices—and, more generally, removes the effects of the preparations for migrating the page of memory.

In some embodiments, despite the restrictions on memory accesses of migrating pages of memory and caching information from the respective page table entries in local caches, accesses to non-migrating pages of memory and their respective page table entries are carried on normally. That is, because preparations for migrating non-migrating pages of memory are not being made and the non-migrating pages of are not to be migrated, accesses of the non-migrating pages of memory and the information in the respective page table entries are not prevented, stalled, or otherwise restricted by the IOMMU. In other words, the IOMMU uses information from such page table entries normally and performs memory accesses of such pages of memory normally. In some embodiments, migration state information for non-migrating pages is set to indicate that the non-migrating pages are in migration state 600. Certain memory accesses of non-migrating pages of memory may, however, be held up for ordering reasons and/or other reasons based on the migration of pages of memory—but can generally proceed as long as the non-migrating pages of memory in the memory and the respective page table entries remain correct.

In some embodiments, the functional blocks, devices, and software entities can transition between migration states in a different order. For example, in some embodiments, migration states can be skipped, as shown by the thin arrow-headed lines between the migration states. For instance, in some embodiments, pages of memory that are only accessible to the processor (and thus are not accessible to IO devices) may be transitioned from migration state 600 directly to migration state 606. In these embodiments, the processor includes page fault mechanisms for handling missing pages of memory and the software entity and/or the page migration engine can simply mark the page of memory as missing in the respective page table entry and proceed with migrating the page of memory. In some embodiments, the processor uses a different page table than the IOMMU and thus pages of memory can be marked as "missing" during migration in the processor's page table—which causes the pages of memory to be handled by the processor using the processor's page fault mechanisms. In some embodiments, however, the processor uses the same page table as the IOMMU, albeit with different available indicators for the processor and the IOMMU. In these embodiments, the processor's available indicator can be set to causes the pages of memory to be handled by the processor using the processor's page fault mechanisms, while the page of memory remains "available" for the IOMMU to be handled (via stalling memory accesses, etc.) as described herein.

Although for the example shown in FIG. 6, only a single page of memory is migrated, in some embodiments, preparations for migrating multiple pages of memory and/or migrating the multiple pages of memory can occur in parallel. In other words, using the above-described migration state information for each page of memory, preparations for migrating two or more pages of memory and/or migrating the two or more pages of memory can be performed at the same or similar times, contemporaneously, etc. Note that the individual pages of memory in this case can be in different migration states—and thus migrations of pages of memory can be commenced dynamically (e.g., as a software entity determines that each page of memory is to be migrated, etc.) and completed in parallel with the preparations for migrating multiple pages of memory and/or migrating of other pages of memory. Each page of memory is thus individually identifiable via its page table entry as being in one of the migration states or in the non-migrating state— and operations for handling accesses of the page of memory and/or the respective page table entry are performed as described herein.

Process for Handling Migrating Pages of Memory

Figure 7:
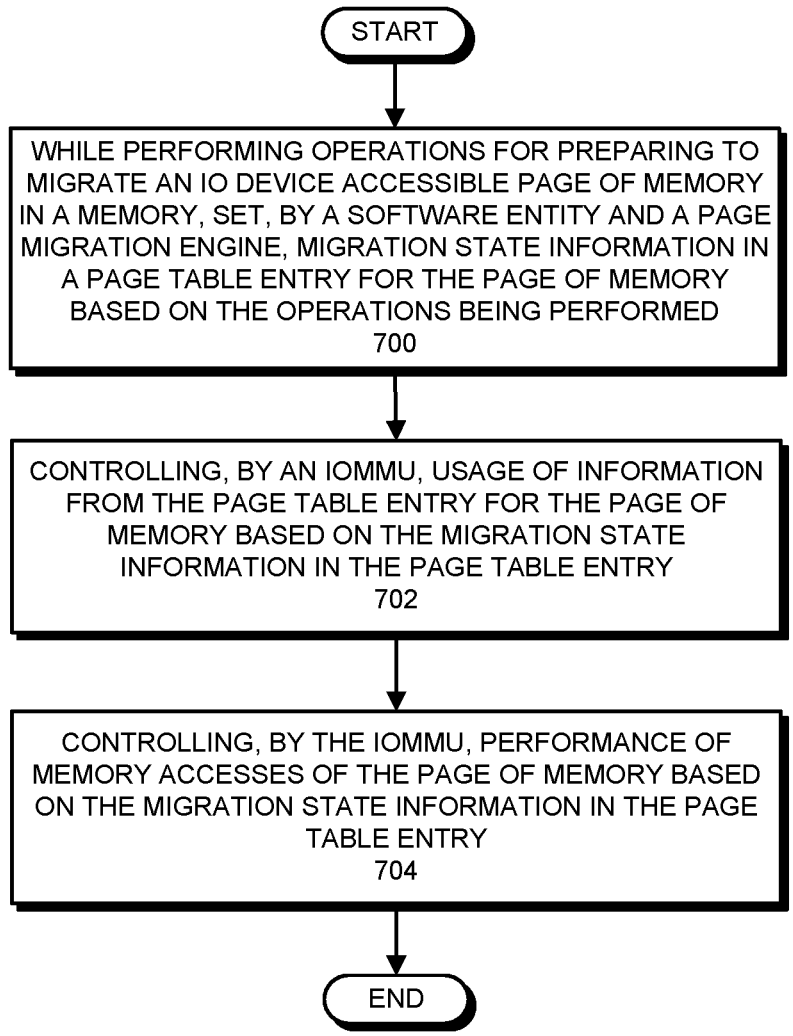
FIG. 7 presents a flowchart illustrating a process for migrating pages of memory in accordance with some embodiments.

In the described embodiments, a software entity (e.g., hypervisor 318, operating system 200, etc.) and a page migration engine (e.g., page migration engine 114) perform operations for controlling memory accesses of pages of memory and the associated page table entries while preparations are being made for migrating the pages of memory and the pages of memory are migrated in a memory (e.g., memory 104). FIG. 7 presents a flowchart illustrating a process for migrating pages of memory in accordance with some embodiments. FIG. 7 is presented as a general example of operations performed by requesters in some embodiments. In some embodiments, however, requesters perform different operations and/or perform the operations in a different order.

As can be seen in FIG. 7, the process starts when, while performing operations for preparing to migrate an IO device accessible page of memory in a memory, a software entity and a page migration engine, set migration state information in a page table entry for the page of memory based on the operations being performed (step 700). Generally, for this operation, as the software entity and the page migration engine perform respective operations for preparing to migrate a page of memory (e.g., a 4 KiB page of memory), the software entity and the page migration engine update the migration information in a page table entry for the page of memory to indicate a current/present migration state. As described above, in migration states 602-606, the software entity and/or the page migration engine perform operations for preparing to migrate the page of memory and then, in migration state 606 (which, as described above, might be divided into migration state 606A, in which the existing/outstanding memory accesses of the second type are completed, and 606B, in which the page of memory is migrated/moved in memory and cleanup operations are performed), the page migration engine performs operations for migrating the page of memory. Setting the migration state information in the page table entry for the page of memory based on the operations being performed therefore involves setting the migration state to identify a migration state for the page of memory. For example, after receiving a request to migrate the page of memory, while (or before) performing initial operations to prepare for the migration of the page of memory, the software entity can set the migration state information to migration state 602, such as by setting the migration state to a bit sequence or value that indicates migration state 602.

In some embodiments, the particular operations that are performed by the software entity and the IO device depend on a current migration state for the page of memory. For example, in some embodiments, among the operations performed by the software entity are operations for invalidating (via corresponding commands to the IOMMU) any existing copy of information from the page table entry in a cache in the at least one IO device. In some embodiments, the software entity performs this operation in migration state 602. As another example, in some embodiments, among the operations performed by the page migration engine are operations for invalidating any existing copy of information from the page table entry in a cache in the IOMMU. In some embodiments, the page migration engine performs this operation in migration state 604. As yet another example, in some embodiments, among the operations performed by the page migration engine are operations for completing any memory accesses to the page of memory—that are not stalled by the IOMMU—prior to migrating the page of memory. In some embodiments, the page migration engine performs these operations this operation in migration states 602-606. The particular sequence/order in which these operations are performed by the software entity and the page migration engine is described above for FIG. 6.

An IOMMU controls the usage of information from the page table entry based on the migration state information in the page table entry (step 702). For this operation, the IOMMU (or, rather, an IOMMU table walker), upon performing a table walk, acquires the migration state information and checks the current value of the migration state information. When the migration state information indicates that preparations are being made for migrating the page of memory and/or the page of memory is being migrated, the IOMMU restricts the usage of the information from the page table. For example, in migration states 602-606, the IOMMU can prevent caching of copies of information from the page table entry in caches in the IOMMU itself or in the IO devices. In contrast, when the migration state information indicates that the page is not being migrated, such as in migration state 600, the IOMMU can use information from the page table normally. In the non-migration migration state, therefore, the IOMMU can itself cache copies of information from the page table entry and can provide IO devices with copies of information from the page table entry (subject to any other existing access restrictions).

The IOMMU also controls the performance of memory accesses of the page of memory based on the migration state information in the page table entry (step 704). For this operation, the IOMMU, as described above, acquires migration state information from the page table entry and checks the current value of the migration state information. When the migration state information indicates that preparations are being made for migrating the page of memory and/or the page of memory is being migrated, the IOMMU can restrict memory accesses to the page of memory. For example, in migration states 604-606, the IOMMU can stall specified newly encountered memory accesses to the page of memory—although existing memory accesses are allowed to proceed to completion before the page of memory is migrated. In contrast, when the migration state information indicates that the page is in other migration states, such as in migration states 600-602, the IOMMU can permit all memory accesses to the page of memory to proceed normally. In these migration states, therefore, the IOMMU performs memory accesses to the page of memory in a typical way, subject to any other existing access restrictions.

Although FIG. 7 presents an example of setting and using state information as preparations are made for migrating a page of memory, in some embodiments, the migration state information is generally present in the page table entry and is used for "controlling" accesses of pages of memory and information in respective page table entries in other cases (i.e., in other migration states). For example, for pages of memory for which the preparations described in FIG. 7 are completed and the pages of memory are actually being migrated (i.e., are in the process of being moved from one location to another in the memory), the migration state information is used by the IOMMU for controlling accesses of pages of memory and information in respective page table entries. In some embodiments, the migration of the page of memory is performed in migration state 606—with the above-described controls on accesses of pages of memory and information in respective page table entries. As another example, for pages of memory that are not being migrated, and thus for which no preparations are being made for migrating the page of memory, the migration state information is used by the IOMMU for controlling accesses of pages of memory and information in respective page table entries. In some embodiments, operations for non-migrating pages of memory are performed in migration state 600—with the above-described controls (or lack thereof) on accesses of pages of memory and information in respective page table entries.

In some embodiments, at least one electronic device (e.g., electronic device 100, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a memory;
an input-output memory management unit (IOMMU);
a processor that executes a software entity; and
a page migration engine, wherein:
the software entity and the page migration engine are configured to perform operations for preparing to migrate, in the memory, a page of memory that is accessible by at least one IO device, wherein the software entity and the page migration engine set, based on the operations being performed, migration state information in a page table entry associated with the page of memory to indicate that preparations are being made for migrating the page of memory; and the IOMMU is configured to use the migration state information in the page table entry to control one or more operations of the IOMMU.

2. The electronic device of claim 1, wherein, when using the migration state information in the page table entry to control the one or more operations of the IOMMU, the IOMMU controls at least one of:
usage of information from the page table entry; and
memory accesses of the page of memory.

3. The electronic device of claim 2, wherein, when setting migration state information in the page table entry associated with the page of memory, the software entity and the page migration engine are configured to:
set, by the software entity and the page migration engine, the migration state information to values that, when read by the IOMMU, cause the IOMMU to control usage of information from the page table entry by:
not storing copies of information from the page table entry in a cache in the IOMMU; and
not providing copies of information from the page table entry to the at least one IO device to be stored be stored in a cache in the at least one IO device.

4. The electronic device of claim 3, wherein, when performing the operations for preparing to migrate the page of memory, the software entity and the page migration engine are configured to:
invalidate, by the software entity, any existing copy of information from the page table entry in a cache in the at least one IO device; and
invalidate, by the page migration engine, any existing copy of information from the page table entry in a cache in the IOMMU.

5. The electronic device of claim 3, wherein, when not providing copies of information from the page table entry to the at least one IO device, the IOMMU is configured not to provide copies of information from the page table entry to the at least one IO device in response to address translation service (ATS) requests from the at least one IO device.

6. The electronic device of claim 2, wherein, when setting migration state information in the page table entry associated with the page of memory, the page migration engine is configured to:
set the migration state information to a first value that, when read by the IOMMU, causes the IOMMU to control performance of memory accesses of the page of memory by:
stalling newly encountered memory accesses of a first type to the page of memory, but permitting existing memory accesses of the first type and a second type and newly encountered memory accesses of the second type to the page of memory to proceed.

7. The electronic device of claim 6, wherein, when setting migration state information in the page table entry associated with the page of memory, the page migration engine is configured to:
set the migration state information to a second value that, when read by the IOMMU, causes the IOMMU to control performance of memory accesses of the page of memory by:
stalling newly encountered memory accesses both the first type and the second type to the page of memory, but permitting existing memory accesses of the first type and the second type to the page of memory to complete.

8. The electronic device of claim 7, wherein, when performing the operations for preparing to migrate the page of memory, the page migration engine is configured to:
ensure that any memory accesses of the first type and the second type to the page of memory that are not stalled are completed prior to migrating the page of memory.

9. The electronic device of claim 2, wherein the page migration engine is further configured to perform operations for migrating the page of memory, the operations including:
moving the page of memory from a first location to a second location in the memory; and
after the moving is completed:
updating information in the page table entry to identify the page of memory as being stored at the second location in the memory; and
setting the migration state information to a value that, when read by the IOMMU, causes the IOMMU to resume using information from the page table entry normally and performing memory accesses of the page of memory normally.

10. The electronic device of claim 9, wherein:
the memory includes two or more different types of memory, each type of memory having different memory characteristics; and
moving the page of memory from the first location in a memory to the second location in the memory involves moving the page of memory from a first of the types of memory to a second of the types of memory.

11. The electronic device of claim 2, wherein the software entity is further configured to set migration state information in an other page table entry for an other page of memory that is not being migrated to a value that, when read by the IOMMU, causes the IOMMU to use information from the page table entry normally and perform memory accesses of the page of memory normally.

12. The electronic device of claim 1, wherein the software entity is one of an operating system or a hypervisor.

13. The electronic device of claim 1, further comprising the at least one IO device coupled to or included in the electronic device.

14. A method for migrating a page of memory in a memory in an electronic device, comprising:
performing operations for preparing to migrate a page of memory that is accessible by at least one IO device in the memory, the performing including setting, based on the operations being performed, migration state information in a page table entry associated with the page of memory to indicate that preparations are being made for migrating the page of memory; and
using the migration state information in the page table entry to control one or more operations of an IOMMU in the electronic device.

15. The method of claim 14, wherein using the migration state information in the page table entry to control the one or more operations of the IOMMU includes controlling at least one of:
usage of information from the page table entry; and
memory accesses of the page of memory.

16. The method of claim 15, wherein setting migration state information in the page table entry associated with the page of memory includes:
setting the migration state information to values that, when read by the IOMMU, cause the IOMMU to control usage of information from the page table entry by:
not storing copies of information from the page table entry in a cache in the IOMMU; and
not providing copies of information from the page table entry to the at least one IO device to be stored be stored in a cache in the at least one IO device.

17. The method of claim 16, wherein preparing to migrate the page of memory includes:
- invalidating any existing copy of information from the page table entry in a cache in the at least one IO device; and
- invalidating any existing copy of information from the page table entry in a cache in the IOMMU.

18. The method of claim 16, wherein not providing copies of information from the page table entry to the at least one IO device includes not providing copies of information from the page table entry to the at least one IO device in response to address translation service (ATS) requests from the at least one IO device.

19. The method of claim 15, wherein setting migration state information in the page table entry associated with the page of memory includes:
- setting the migration state information to first value that, when read by the IOMMU, causes the IOMMU to control performance of memory accesses of the page of memory by:
  - stalling newly encountered memory accesses of a first type to the page of memory, but permitting existing memory accesses of the first type and a second type and newly encountered memory accesses of the second type to the page of memory to proceed.

20. The method of claim 19, wherein setting migration state information in the page table entry associated with the page of memory includes:
- setting the migration state information to second value that, when read by the IOMMU, causes the IOMMU to control performance of memory accesses of the page of memory by:
  - stalling newly encountered memory accesses both the first type and the second type to the page of memory, but permitting existing memory accesses of the first type and the second type to the page of memory to complete.

21. The method of claim 20, wherein preparing to migrate the page of memory includes:
- ensuring that any memory accesses of the first type and the second type to the page of memory that are not stalled are completed prior to migrating the page of memory.

22. The method of claim 15, further comprising:
performing operations for migrating the page of memory, the operations including:
- moving the page of memory from a first location to a second location in the memory; and
- after the moving is completed:
  - updating information in the page table entry to identify the page of memory as being stored at the second location in the memory; and
  - setting the migration state information to a value that, when read by the IOMMU, causes the IOMMU to resume using information from the page table entry normally and performing memory accesses of the page of memory normally.

23. The method of claim 22, wherein:
the memory includes two or more different types of memory, each type of memory having different memory characteristics; and
moving the page of memory from the first location in a memory to the second location in the memory involves moving the page of memory from a first of the types of memory to a second of the types of memory.

24. The method of claim 15, further comprising:
setting migration state information in an other page table entry for an other page of memory that is not being migrated to a value that, when read by the IOMMU, causes the IOMMU to use information from the page table entry normally and perform memory accesses of the page of memory normally.

* * * * *